Aug. 8, 1950          J. S. TOWNSEND          2,518,404
                    CHARGING BOX LOADER
Filed Jan. 9, 1946                        2 Sheets-Sheet 1
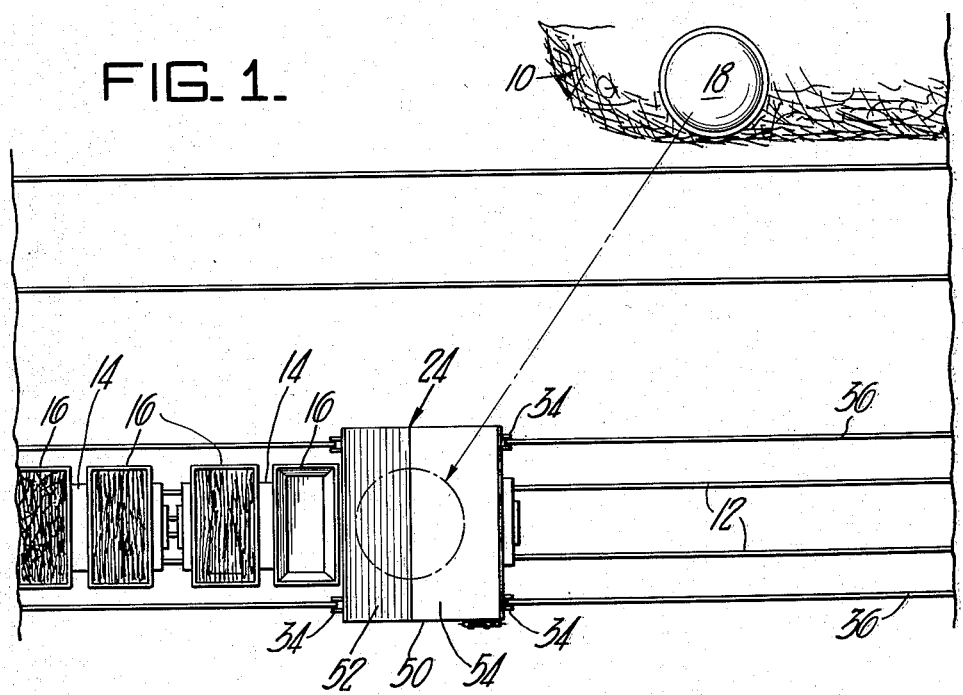
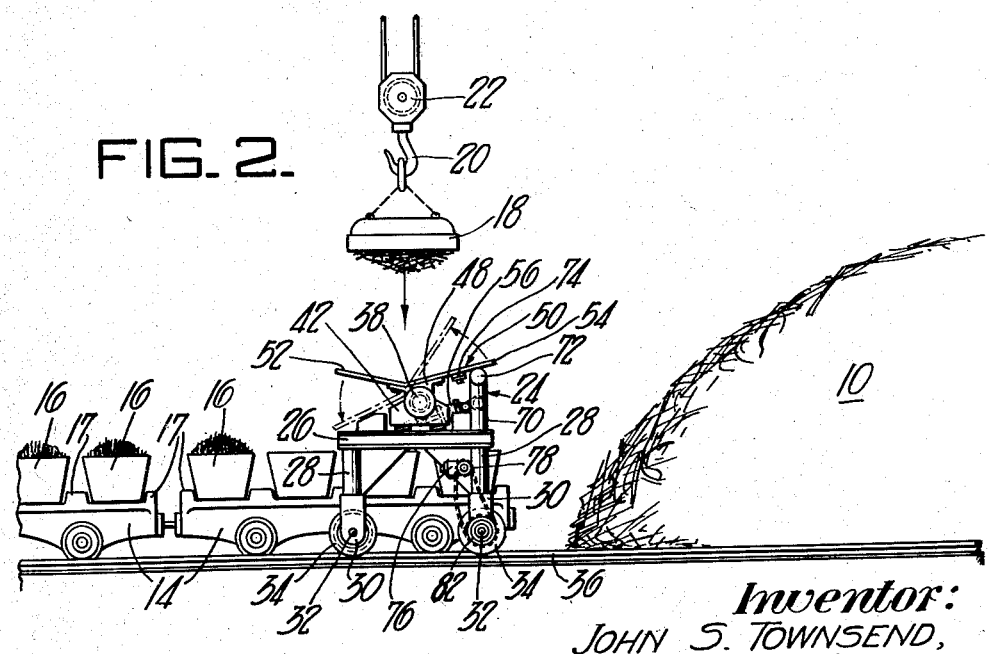
Inventor:
JOHN S. TOWNSEND,
by: Donald G. Dalton
his Attorney.

Aug. 8, 1950 — J. S. TOWNSEND — 2,518,404
CHARGING BOX LOADER
Filed Jan. 9, 1946 — 2 Sheets-Sheet 2
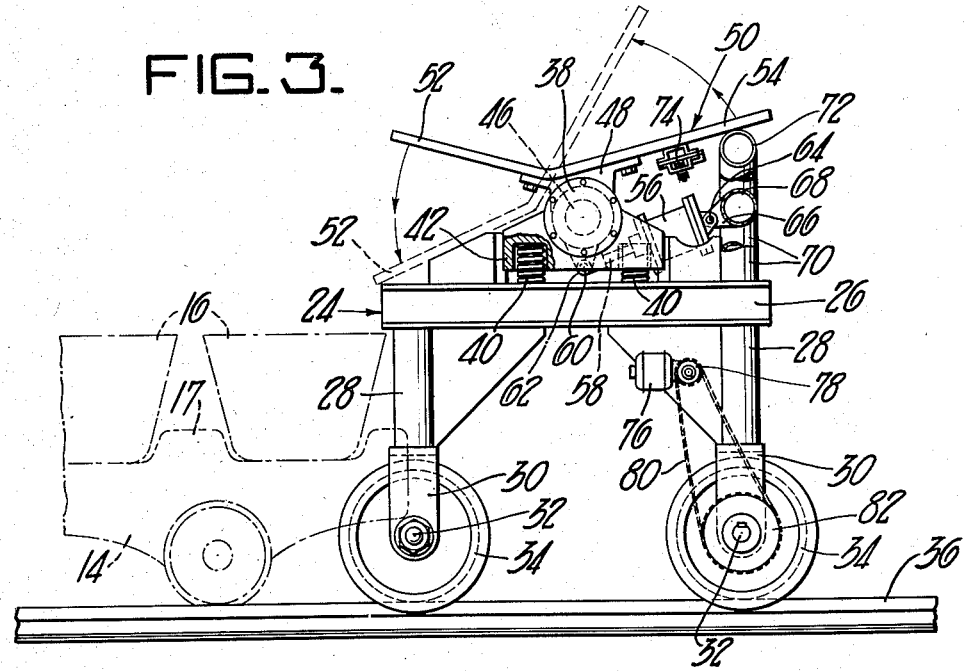
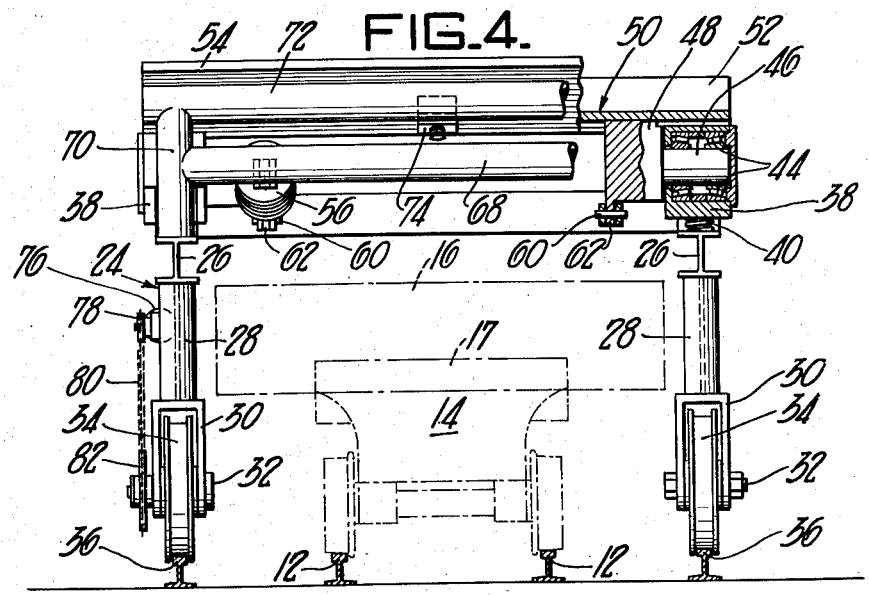
Inventor:
JOHN S. TOWNSEND,
by: Donald G. Dalton
his Attorney.

Patented Aug. 8, 1950

2,518,404

UNITED STATES PATENT OFFICE 2,518,404

CHARGING BOX LOADER

John S. Townsend, Chicago, Ill., assignor to Carnegie-Illinois Steel Corporation, a corporation of New Jersey Application January 9, 1946, Serial No. 639,948

2 Claims. (Cl. 226—68)

The present invention relates to improvement in a charging box loader adapted to deliver a charge of scrap to a charging box of the type conventionally used for dumping scrap into an open hearth steel making furnace.

As those skilled in the art are well aware, it has been the conventional practice for many years to include a substantial percentage of scrap metal in the charge melted in an open hearth steel furnace. This scrap is accumulated in sizeable stock piles and is usually a somewhat homogeneous collection of discarded metal parts. When it is deposited in the charging box, according to prior practice the pieces of scrap are irregularly arranged with substantial voids and with parts projecting over the sides and ends of the charging boxes. This presents a hazard to workmen and interferes with the proper introduction of the filled charging box through the relatively small charging doors of the usual open hearth furnace.

The present invention provides an improved loader for charging boxes which takes the form of a truck frame having a plurality of depending brackets each with a wheel journaled at the lower portion thereof, the truck being thus arranged to straddle a charging box to be loaded which is mounted on a car, the loader including a table tiltingly and yieldingly supported by the loader frame, there being means provided for vibrating the table for the express purpose of concentrating and orienting the pieces of scrap on the table so that when the load is dumped into the charging box by a tilting movement of the table, the scrap pieces will be oriented so that all the pieces are substantially parallel with their greatest dimension extending in the direction of length of the charging box.

The above and other features of the invention will be fully apparent from consideration of the following detailed disclosure and appended claims when read in connection with the accompanying drawings, in which:

Figure 1 is a plan of a portion of a scrap stock yard showing my improved loader in use.

Figure 2 is a front elevation of parts shown in Figure 1.

Figure 3 is an enlarged side elevation of the improved loader herein claimed, with parts broken away and other parts shown in section.

Figure 4 is an elevation from the right end of Figure 3, with parts shown in section for clearness.

Referring in detail to the drawings, reference numeral 10 represents a pile of metal scrap such as usually accumulates in the stock yard of a steel plant; 12—12 represents the rails of a charging car track over which cars 14 carrying charging boxes 16 of conventional form are adapted to travel from the stock yard to a point in front of the open hearth steel furnace where the charging boxes 16 are adapted to be engaged in a conventional manner with a known form of charging machine which enters each charging box successively through a selected door of an open hearth furnace and dumps the charge into the furnace.

Prior to my invention, the pieces of scrap have been picked up by an electromagnetic head of the type indicated at 18, suspended from a hook 20 carried by a block and fall 22 suspended from a suitable overhead traveling crane. The magnetic device 18 heretofore has picked up the pieces of scrap and dumped them haphazardly directly into the charging boxes 16, with the result that the pieces were irregularly accumulated in the charging boxes with much waste space, due to the voids between the pieces.

The present invention overcomes the above and other objections inherent in the prior practice by the provision of the herein claimed loader indicated as a whole at 24. This loader includes a truck frame 26 built of suitable structural steel members, the frame being substantially rectangular in plan and having near its corners depending brackets 28 the lower ends of which include bearing portions 30 to accommodate axles 32 of the loader wheels 34. The loader wheels are adapted to ride on rails 36 arranged parallel to but outside of the charging car rails 12, and the height of the brackets 28 is such that the loader straddles the charging boxes 16 which are usually positioned between lugs 17 on the charging box car 14, as shown in Figure 2.

Yieldingly mounted on the truck frame I provide bearings 38 resting on springs 40 suitably positioned on the truck frame. These springs 40 engage sockets 42 formed in the lower portions of the bearings 38. The bearings are equipped with antifriction members 44 for coaction with trunnions 46 carried by brackets 48 bolted to the under side of a table 50 including oppositely inclined plate-like portions 52 and 54, thus forming a V-shaped load-receiving table. The table 50 is adapted to be tilted about the axis of the trunnions 46, and for this purpose I have shown a cylinder 56 having a suitable double acting piston therein for reciprocating a rod 58 which is pivotally connected at 60 to an arm 62 depending from the table bracket 48. The outer end of the cylinder 56 is pivotally connected at 64 to a bracket 66 projecting from a cross-bar 68 which at its ends is connected to uprights 70. In accordance with well understood principles of piston and cylinder mechanisms, when the piston is forced inwardly with respect to the cylinder, table 50 moves from the position shown in solid lines in Figure 3 to the position shown in dotted lines. When the piston is forced outwardly with respect to the cylinder, the table returns to the position shown in full lines. Instead of using the air cylinder 56 for tilting the table 50, it is contemplated that I may substitute other equivalent thrust mechanism of known construction, the function of which will be to tilt the table about the axis of the trunnions 46.

Spanning the two uprights 70 at the opposite sides of the truck frame and secured to the tops of the uprights is a cross brace 72 which serves as a back stop and support for the table when it is in the full line load-receiving position of Figure 3. The portion 54 of the tiltable table has secured to the under side thereof a vibrating mechanism indicated conventionally at 74. This vibrator may take the form of an air-operated unit of known form of the type made by the New Haven (Connecticut) Vibrator Company, or instead of an air vibrator I may use an electrically operated vibrator such as made by the Syntron Company of Homer City, Pennsylvania. Regardless of whether the electric or air-operated vibrators are used, it will be understood that the function of the vibrator is to impart a rapid or high-frequency vibratory motion to the V-shaped table 50 so as to agitate the pieces of scrap which are somewhat haphazardly arranged when initially dumped thereon by the magnetic head 18. The vibratory action agitates the load supported between the oppositely inclined portions 52 and 54 of the tiltable table, and the vibratory action combined with the tendency of the load to slide by gravity down said inclined portion is effective to orient the pieces so that their longest dimensions extend substantially parallel to one another and in the direction of the longitudinal axis of the trunnions 46. After the charge has been vibrated for a sufficient length of time to orient and concentrate a load on the tiltable table, air is admitted to the cylinder 56 by manipulation of a suitable control valve (not shown). This causes the piston in the cylinder to move in the proper direction to tilt the table from the full line position to the dotted line position of Figure 3 and thus permit the oriented pieces of scrap material to slide down the inclined portion 52 of the table and fall into the particular charging box 16 adjacent which the loader has been previously spotted. After a sufficient number of charges have been vibrated and successfully dumped into the charging box to fill it, the loader is propelled along its track 36 to bring it into position to charge the next box on the train of cars. The loader may be propelled by power, for example, by means of an electric motor 76 driving a sprocket wheel 78 through suitable reduction gearing, which sprocket wheel transmits motion through chain 80 to a drive sprocket 82 carried by the axle of one of the wheels 34.

The vibrator 74 should have sufficient capacity to vibrate the table 50 with a full load of scrap resting thereon. During the vibratory motion, the springs 40 supporting the table will be deflected slightly, and they will also act as shock absorbers when the load of scrap pieces are released from the lifting magnet 18 and dropped onto the table.

After all of the charging boxes 16 carried by the train of cars 14 have been loaded, the cars 14 are pulled by a yard locomotive over the tracks 12 to the building housing the open hearth furnaces, whereupon the conventional charging machine successively picks up each charging box 16, introduces it through the charging door of the open hearth furnace, dumps the contents onto the hearth thereof by inverting the box, and returns the empty charging box to the charging box car 14.

The improved loader described is intended to obviate the disadvantages of filling charging boxes direct with a magnet, as heretofore practiced by the steel industry. The old practice of delivering haphazardly arranged pieces of scrap by releasing the scrap from a lifting magnet positioned over the box is a dangerous procedure, and men have been frequently injured by the material and are also subject to injury while trying to arrange the material in the boxes after the magnet has dropped its load like a pile of jackstraws on the top of a row of boxes. In the old practice extra time was required by the magnet crane operator, in trying to assist the crew in arranging the pieces of scrap in the boxes, and in the old practice the boxes were frequently only partially filled. This contributed to a loss of efficiency by requiring extra time in charging the furnaces, and more labor was required to load the scrap and arrange it in the boxes than that which is required by use of the herein disclosed loader. The improved loader eliminates the hazards of prior practice, and makes possible an important saving of time in charging the furnace with scrap, since the orienting and concentrating of the component parts of each box charge increases the working capacity of each box-full.

While I have described quite precisely a preferred design and arrangement of scrap loader, it is to be understood that various modifications and substitutions of equivalents may be made by those skilled in the art without departing from the invention as defined in the appended claims.

I claim:

1. A loading device for charging boxes comprising a frame adapted to straddle a charging box and having wheels journaled to its lower portion, a pair of spaced horizontally aligned bearings resiliently mounted on said frame, a solid platform of shallow V-shape in side elevation supported in said bearings for pivotal movement about a horizontal axis, said platform having a position for receiving and retaining scrap material from a crane and a position for discharging this material by gravity to a charging box, a vibrator attached to said platform for vibrating the platform and the material thereon and thus compacting the latter, and thrust mechanism connected to said frame and said platform for pivoting the latter between its two positions.

2. A loading device for charging boxes comprising a frame adapted to straddle a charging box and having wheels journaled to its lower portion, a pair of spaced horizontally aligned bearing, springs resiliently mounting said bearings at the sides of said frame, a stop mounted at the rear of said frame, a solid platform of shallow V-shape in side elevation supported in said bearings for pivotal movement about a horizontal axis, said platform having a position in which its rear portion engages said stop for receiving and retaining scrap material from a crane and a position in which its front portion engages said frame for discharging this material by gravity to a charging box, a vibrator attached to said platform for vibrating the platform and the material thereon and thus compacting the latter, and a piston and cylinder connected to said frame and said platform for pivoting the latter between its two positions.

JOHN S. TOWNSEND.

REFERENCES CITED

The following references are of record in the file of this patent:

UNITED STATES PATENTS

| Number | Name | Date |
|---|---|---|
| 1,714,239 | Pratt | May 21, 1929 |
| 2,323,864 | Weyandt | July 6, 1943 |
| 2,376,810 | Richardson | May 22, 1945 |